United States Patent [19]

Wykoff

[11] Patent Number: 4,702,845
[45] Date of Patent: Oct. 27, 1987

[54] ROTARY DRUM FILTER
[75] Inventor: Richard H. Wykoff, Livonia, Mich.
[73] Assignee: Amsted Industries Incorporated, Chicago, Ill.
[21] Appl. No.: 826,806
[22] Filed: Feb. 6, 1986
[51] Int. Cl.⁴ ............................................. B01D 33/06
[52] U.S. Cl. ................................... 210/784; 210/793; 210/108; 210/161; 210/333.01; 210/402; 210/411; 210/427
[58] Field of Search .................. 210/325, 333.01, 402, 210/340, 416.1, 411, 393, 427, 108, 161, 784, 792, 793, 794

[56] References Cited
U.S. PATENT DOCUMENTS
1,812,042  6/1931  Genter ............................... 210/325
4,169,792 10/1979  Dovel ................................ 210/411

Primary Examiner—Frank Sever
Attorney, Agent, or Firm—Edward J. Brosius; Charles E. Bouton

[57] ABSTRACT

The present invention provides a rotary drum filter wherein one or preferably two rotary drum filters are submerged in a tank of liquid to be filtered. Each rotary drum filter is comprised of a generally cylindrical tank having a perforated outer wall plate over which is applied a cloth type filter media. A suction pipe is included inside the rotary drum filter so that filtered liquid can be drawn into the rotary drum filter through the pressure differential established by the suction pipe. Clean filtered liquid exits the suction pipe to the industrial apparatus with which the filter apparatus is used. A backwash vacuum box extending generally the length of the rotary drum filter media is in contact with a portion of the rotary drum filter media. A partial vacuum is established in the vacuum box such that filtered liquid can be drawn outwardly from the rotary drum filter such that solids accumulated on the filter media are drawn off from the filter media thereby cleaning that section of the filter media. Drive means are provided to rotate the rotary drum filter so that the backwash vacuum box is exposed to the entire circumference of the rotary drum filter upon one complete revolution of the rotary drum filter.

11 Claims, 5 Drawing Figures

ROTARY DRUM FILTER

BACKGROUND AND SUMMARY OF THE INVENTION

The present invention relates to industrial filtration apparatus and, more particularly, to a rotary drum filter utilizing a cloth type media.

One method of filtering solids suspended in a liquid is to submerge a rotary drum filter in a tank of liquid to be filtered. A pressure differential is established between the inner portion of the drum filter and the liquid to be filtered such that the liquid to be filtered is drawn into the drum filter through the appropriately perforated walls of the drum filter. A major problem with such filters is the type of filter media selected to be used on the outer walls of the drum filter. It is most desirable to use a cloth type, also called a permanent media type, filter media on the outer wall of the drum filter as the type of cloth selected can give the desired filter performance characteristics. Such characteristics include flow rate and the degree of suspended solid or fines removal. However, it has proven extremely difficult to remove such fines from the filter media. In many cases it has been necessary to shut down the filtering operation and perform the necessary scraping and removal of the accumulated solids from the outer surface of the filter media. This is undesirable as such down time introduces an equivalent down time in the manufacturing operation to which the industrial filter is connected.

Accordingly, it is an object of the present invention to provide a rotary drum filter capable of continuous filtering operation and further capable of removal of accumulated solids on the filter media during such filtering operation.

The present invention utilizes a rotary drum filter and, in a preferred embodiment, two rotary drum filters, suspended in a tank containing liquid to be filtered. Most typically these rotary drum filters are vertically mounted in the tank, but with appropriate sealing, the rotary drum filters could be mounted horizontally or at other required angles in the tank.

A suction pipe is located within the rotary drum mechanism and is coaxial therewith. Further, the drum is actually connected to the suction pipe through a rotary bearing and seal configuration. This bearing supports the weight of the drum and provides resistance against side thrust from the drive mechanism used to rotate the drum. In the preferred two rotating drum arrangement, each drum is rotated about its center line axis by a single drive mechanism operatively connected to each drum. The drive can be either an air cylinder and ratchet combination or an electric motor and reducer combination. The drive rotates a shaft on which is mounted a sprocket that meshes with chains wrapped around and attached to the upper end of each drum.

The drums are rotated for the purpose of removing the accumulated solids or cake from the outer surface of the filter media. A backwash vacuum box or suction box comprising a generally elongated rectangular arrangement is provided in contact with the filter media of the single drum or with both drums in the preferred two rotary drum arrangement. As the drums are rotated at about one revolution per minute past the vacuum box which covers only a small portion of the entire circumference of the drum, a partial vacuum is drawn in the vacuum box such that filtered liquid is drawn from the inside of the rotary drum through the filter media into the vacuum box. Accordingly, the accumulated solid cake on the outer surface of the media is removed and discharged to the vacuum box. Filtration through the filter media not in contact with the vacuum box continues during such backwashing operation. Depending on the flow rate and filter media chosen, the degree of vacuum drawn through the suction pipe and established within the rotary drum filter is about eight-ten inches of mercury (20-25 cm.). The partial vacuum established in the vacuum box is at about twelve-fifteen inches of mercury (30-38 cm.). Accordingly, a pressure differential exists between the filtered liquid in the rotary drum filter and in the vacuum box when a vacuum is drawn in the vacuum box. Filtered liquid will flow from the rotary drum filter through the portion of the filter media adjacent the vacuum box. This action causes the accumulated solids or cake built up on the filter media to be broken away and deposited in the vacuum box. Appropriate sludge accumulation equipment is part of the vacuum box arrangement for disposal of the filtered cake. Sealing flaps of a rubber like material can also be provided on the edges of the vacuum box adjacent and in contact with the filter media. Such flaps aid in the separation of heavier caking of filtered solids away from the filter media. Such solids would fall to the bottom of the tank wherein appropriate conveyor equipment would carry such solids away for proper disposal. The vacuum box would be actuated by various means such as sensing devices to detect a particular rise in vacuum between the rotary drum filter and the liquid to be filtered in the tank, by a timer setting or by simple manual actuation. It is important to realize that the filtration accomplished by the rotary drum filters can continue during the actuation of the rotation mechanism and the vacuum box. It may be necessary, for example, to actuate the rotation device and vacuum box for only one or two times per hour of filtration. Further, filtration continues to take place during the activation of the vacuum box. Once the rotary drum filter has accomplished one complete revolution, adequate removal of the filter cake from the filter media occurs such that the vacuum box and rotation mechanism may be deactivated until further build up of solids on the filter media has occurred. It should also be noted that the filter media is appropriately joined at the top and bottom of the rotary drum by such means as rubber O rings which hold the filter media embedded in a groove at the top and at the bottom of the rotary drum.

DESCRIPTION OF THE PREFERRED EMBODIMENT

Figure 1:
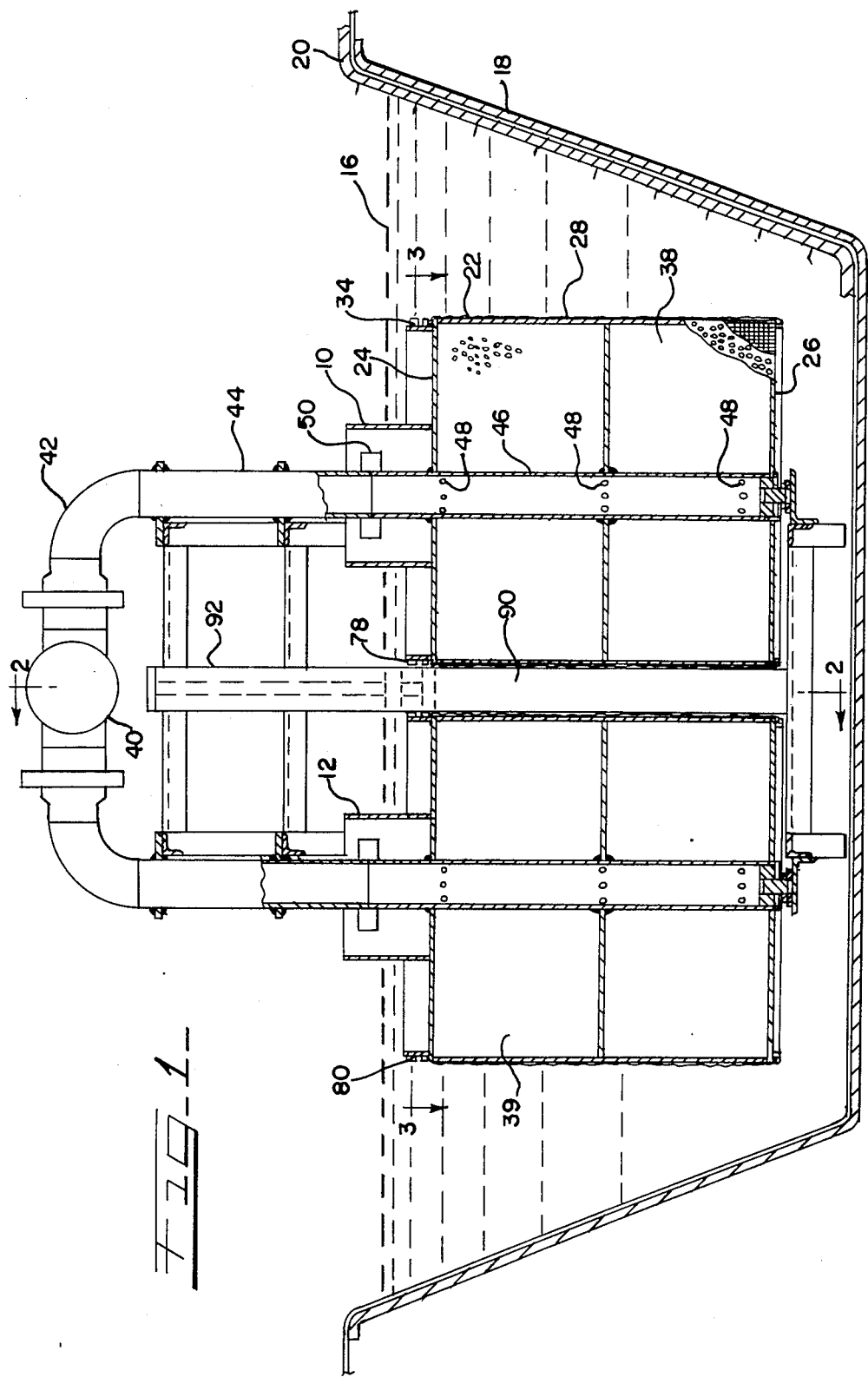
FIG. 1 is a front view in partial cross section of a two rotary drum filter in accordance with the present invention.
Figure 2:
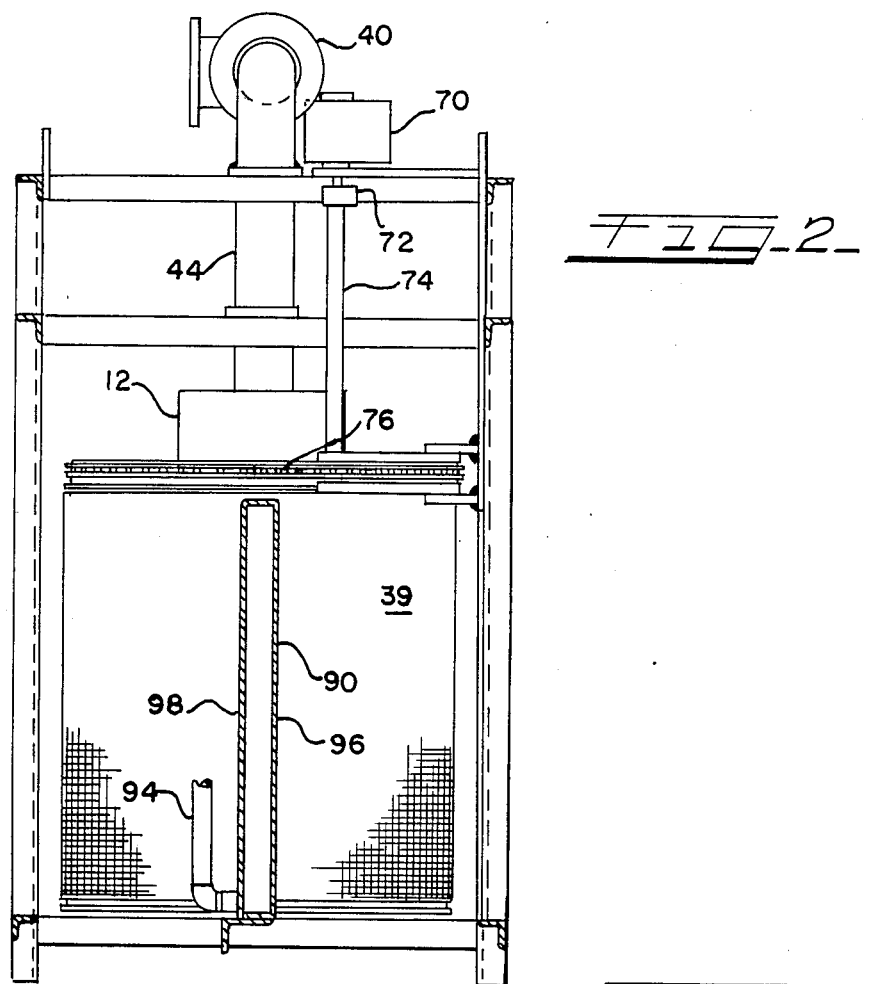
FIG. 2 is a side view along lines 2—2 of the rotary drum filter shown in FIG. 1.

Referring to FIGS. 1 and 2 of the drawings, a filter apparatus in accordance with the present invention is shown comprising two rotary drum filters 10 and 12. Rotary drum filters 10 and 12 are mounted vertically in tank 18 which is filled with fluid to be filtered 16. Solids which may be accumulated and scraped off the rotary drum filter media in a manner to be described later are removed from the bottom of the tank by a drag conveyor mechanism 20, shown partially.

Figure 4:
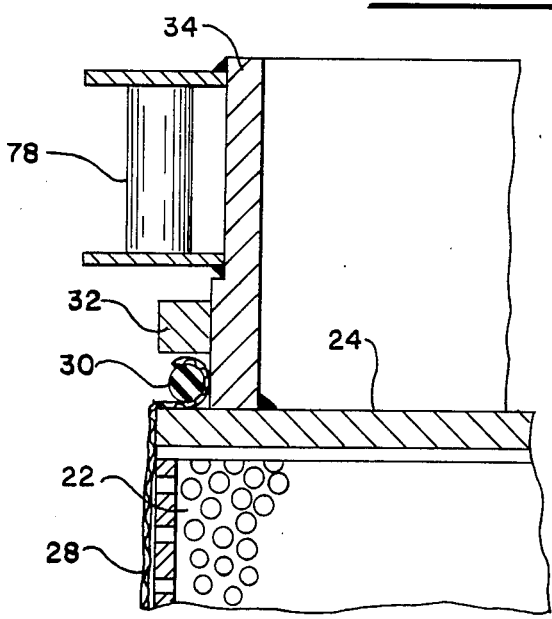
FIG. 4 is a detailed cross sectional view of a portion of the rotary drum filter of FIG. 1 showing the filter media, filter media holding ring, drive chain and a portion of the perforated drum plate.

Since rotary drum filters 10 and 12 are identical, the various components of rotary drum filter 10 will be described, with the understanding that similar components make up rotary drum filter 12. The drums which comprise the rotary drum filters are usually constructed of perforated steel cylinders 22 with solid steel end plates 24, 26. Depending on the flow requirements, the drums can be one to two meters in diameter and one to two meters in height or more depending on the installation requirements. The perforated plate walls 22 of the drum are covered with a filtration fabric 28 which is designed to be able to easily release the accumulated solids or filter cake. The weave of the filter cloth determines the degree of filtration. Cloth with 100 micron diameter openings have been successfully used; finer or coarser fabric may be used depending on the degree of filtration desired and the flow rates required. Of course, finer filtration usually results in lower flow rates. The filtration fabric 28 is wrapped around the drum 22 and is held in place with a bar (not shown) bolted through the ends of the fabric 28 forcing the ends into a groove running the length of the drum wall 28. Referring now to FIG. 4, the sides of the filter fabric 28 are held by rubber O rings 30 embedded in a groove formed by washer 32 encircling top section 34 of rotary drum filter 10. A similar O ring and groove arrangement holds the bottom of filter media 28 to the bottom of rotary drum filter 10. With such sealing arrangement provided by O ring 30 holding filter media 28 to the top and bottom of perforated plate 22, there is no possibility of the flow of liquid to be filtered into tank 38 of rotary drum filter 10 other than through filter media 28.

Flow of liquid 16 to be filtered through filter fabric 28 is caused by filter pump 40 drawing a vacuum of about eight inches of mercury (20 cm.) through connection pipe 42 into upper suction pipe section 44, through rotary seal 50 and into lower suction pipe section 46. Note that lower suction pipe section 46 has several openings 48 through which filtered liquid can enter the suction pipe. Accordingly, flow of liquid to be filtered 16 is induced by establishing a pressure differential across filter fabric 28 to cause flow through filter fabric 28 wrapped on the outside of drum 22. As the flow of liquid to be filtered 16 continues through filter fabric 28, solids or dirt accumulates on the outside of fabric 28 forming a cake thereon.

Figure 5:
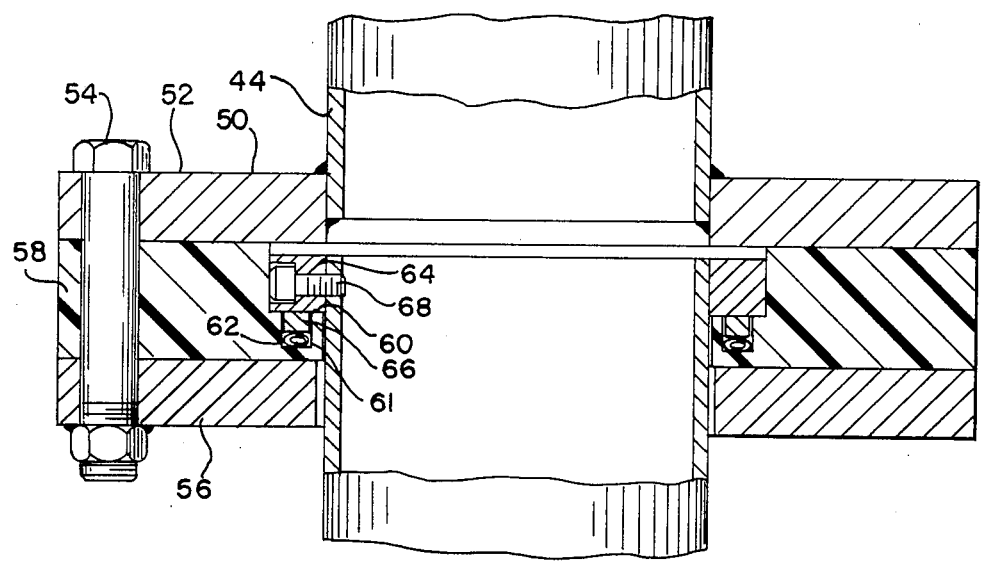
FIG. 5 is a detailed cross sectional view of the rotary seal joining the top section of the suction pipe to the bottom section of the suction pipe of the rotary drum filter of FIG. 1.

Rotary drum filter 10 is suspended through rotary joint 50 and is affixed to lower suction pipe section 46. Rotary joint 50, referring to FIG. 5 of the drawings, is located in the suction pipeline just above the top of the drum, and consists of a plastic bearing and seal. The bearing supports the weight of drum 10 and, as will be explained below, resists any side thrusts resulting from the drive mechanism transferring rotary motion to the drum.

Rotary joint 50 comprises an upper metal ring 52 welded to top suction pipe section 44. A lower metal ring 56 is affixed to top metal ring 52 by bolts such as 54. A plastic bearing 58 is sandwiched between upper metal ring 52 and lower metal ring 56, and is held in place by bolts such as 54 passing through appropriate openings in plastic bearing 58. A section of plastic bearing 58 is cut out to form shoulder 60, and a further cavity 61 is formed in shoulder 60. Cavity 61 is circular and includes a circular gasket 62 of appropriate material such as neoprene rubber. A metal ring 64 is bolted by means such as bolts 68 to the upper portion of lower suction pipe section 46, and a plastic ring 66 is included in cavity 61 in compressed contact between gasket 62 and the lower surface of metal ring 64. Plastic flange 66 is in compressed contact with gasket 62 so as to form a seal. Accordingly, liquid flowing upwardly through lower suction pipe section 46 would flow without leaking into upper suction pipe section 44. Further, the rotation of lower suction pipe section 46, by a mechanism to be described below, is readily accomplished due to the low friction bearing contact of metal ring 64 with shoulder 60 of plastic bearing 58.

Figure 3:
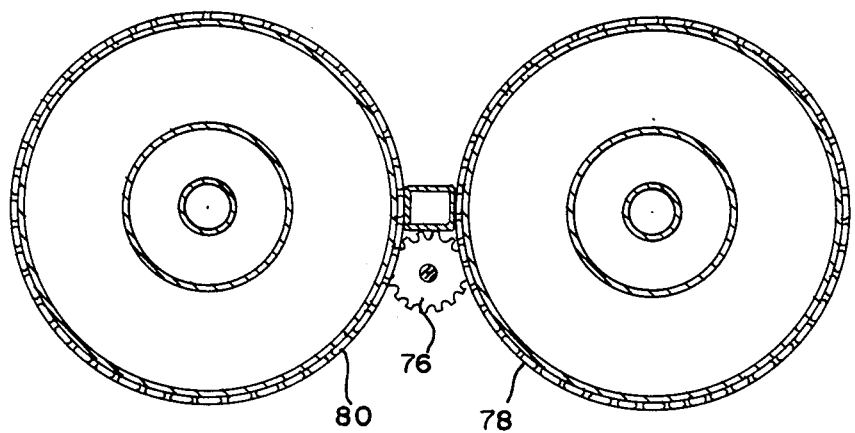
FIG. 3 is a top view along lines 3—3 of the rotary drum filter shown in FIG. 1.

Both rotary drum filters 10 and 12 are rotated about their vertical center lines, as explained above for rotary filter 10, about rotary seal 50 with lower suction pipe section 46 rotating, by a single drive mechanism such as air cylinder drive 70. Air cylinder drive 70 has its output through a ratchet 72 and extending through drive shaft 74 to drive sprocket 76. Referring now to FIGS. 3 and 4, drive sprocket 76 engages drive chain 78 surrounding top portion 34 of rotary drum filter 10 and drive chain 80 surrounding the top portion of rotary drum filter 12. The drive chains are affixed to the appropriate portions of the rotary drum filters 10 and 12 by means such as tack welding. Note that for a given rotation of drive sprocket 76, opposite rotations of rotary drum filters 10 and 12 will occur, but this is immaterial to the present invention. Further, air cylinder drive 70 could readily be replaced by an electric motor, as the particular filtration application best dictates.

The rotary drum filters are rotated for the purpose of removing the accumulated solids or cake from the outer surface of filter media such as 28 on drum 10. The drums are rotated at about one revolution per minute, when such solid removal or backwashing is required, past suction box 90 which is connected via line 92 to a backwash suction pump (not shown). This suction pump draws a greater vacuum, about twelve-fifteen inches of mercury (30–38 cm.) than the filter suction pump. Accordingly, the backwash pump, when operating, causes a flow of filtered liquid from the inside 38 of rotary drum filter 10 and the inside 39 of rotary drum filter 12 outwardly through the filter fabric into suction box 90 located on the outside of the filter drums. This backwards flow removes the accumulated solids from the outside of the filter media and discharges it to the vacuum box. The so accumulated solids in vacuum box 90 are drawn off through vacuum box piping 94 for appropriate disposal. Note that filtration of liquid to be filtered 16 inwardly to the insides 38 and 39 of rotary drum filters 10 and 12 continues during such backwashing operation.

The rotation of the filters of the rotary filter drums is necessary since backwash vacuum box 90 is of a vertical shape and generally rectangular configuration and accordingly only contacts a small fraction of the total surface area of the rotary drum filters. The entire accumulation of solids on the filter media can be removed during one complete revolution of the rotary drum filter. Accordingly, the relatively short duration of the backwash operation results in a minimum amount of backwash flow. The initiation of backwash and rotation of the drums is usually initiated in one of three ways. Appropriate metering can detect the increasing resistance to flow of liquid to be filtered into the drum filters 10 and 12 and, upon reaching a limit pressure differential, backwashing can be initiated. A timer operation can be used to initiate backwashing after a set time period has passed, or backwashing can be manually initiated as deemed necessary by an operator. Drums 10 and 12 may be entirely rotated during such backwashing to clean the entire circumference of the filter drums, or it may be desirable to only clean a portion of the circumference and use the remaining accumulated filter cake as a finer filter.

As explained above, note that vacuum box 90 extends the entire length of the filter drums. Further, vacuum box 90 includes rubber flaps 96 and 98 that contact filter media 28 on drum 10 and the corresponding filter media on rotary filter drum 12. Flaps 96 and 98 serve to seal the vacuum area so that the backwash pump can establish the appropriate pressure differential with the interiors 38 and 39 of the drums so as to cause the filter flow outwardly through the media into backwash vacuum box 90 only at the area between such flaps. Further, sealing flaps 96 and 98 serve to scrap off heavy accumulations of solids or cake from the filter media 28 and the corresponding media on drum 12. Such solids fall to the bottom of tank 18 and are removed by drag conveyor 20.

What is claimed is:

1. A filtration apparatus comprising means designed for the filtering of solids suspended in a liquid and, from time to time during the filtering operation, simultaneously removing said solids deposited on a filter media to maintain continued operation of the filtration apparatus including
    a drum filter having a perforated plate forming an outer shell and a suction pipe within said outer shell,
    a filter media surrounding said outer shell,
    means to apply suction to said suction pipe whereby liquid to be filtered is drawn into said drum filter, with solids suspended in said liquid being deposited on the outer surface of said filter media with filtered liquid being drawn into said suction pipe,
    a drive means capable of rotating said drum filter,
    and a vacuum box in operative connection with a portion of an outer surface of said drum filter such that, upon the rotation of said drum filter, the accumulated solids on said drum filter media are drawn off of the filter media by a flow of filtered liquid outward through the portion of the filter media in operative connection with the vacuum box when a partial vacuum is established in the vacuum box while said filtered liquid continues to be drawn into said suction pipe.

2. The filtration apparatus of claim 1 wherein said drum filter is generally cylindrical in shape, and said filter media is a permanent cloth type media,
    said filter media being wrapped around said drum filter and the ends of said filter media being held to said drum filter by a bar bolted through the ends of said filter media to said drum filter perforated plate.

3. The filtration apparatus of claim 1 wherein said drum filter is generally cylindrical, said filter media comprises a permanent cloth type media, a groove is provided in the upper and lower edges of said drum filter and rubber rings hold the edges of said filter media to within the grooves at the upper and lower edges of said drum in a liquid impervious seal.

4. The filtration apparatus of claim 3 wherein said drum filter is suspended from said lower section of suction pipe by a rotary joint.

5. The filtration apparatus of claim 4 wherein said rotary joint comprises a first metal ring affixed to an upper section of said suction pipe, a plastic ring and a second metal ring joined to said first metal ring with said plastic ring therebetween, said plastic ring having a groove therein forming a shoulder, a groove in said shoulder including a rubber gasket,
    a lower section of said suction pipe including a flange extending from an upper edge thereof, said flange including a plastic ring which extends into said groove in said plastic ring to compress said rubber gasket and thereby form a rotatable seal between said upper and said lower sections of said suction pipe.

6. The filtration apparatus of claim 1 wherein two drum filters and suction pipes are provided, with one suction pipe extending into one drum filter.

7. The filtration apparatus of claim 6 including a vacuum box in operative contact with a portion of the outside of both drum filters,
    and a drive means adapted to rotate both of said drum filters such that, upon the rotation of said drum filters, the accumulated solids on said drum filter media are drawn off of the filter media by a flow of filtered liquid outward through the portion of the filter media in operative contact with the vacuum box when a partial vacuum is established in the vacuum box.

8. The filtration apparatus of claim 6 including a drive means to rotate said drum filters, said drive means comprising two chains affixed one each near the top of each drum filter, each of said chains surrounding the entire circumference of said drum filter, and a drive gear mechanism engaging both of said chains so that, upon the rotation of said drive gear mechanism, both of said drum filters are rotated.

9. The filtration apparatus of claim 1 wherein said vacuum box includes sealing flaps that contact said filter media on said drum filter such that, upon the rotation of said drum filter, the solids accumulated on said filter media are scraped off.

10. A filtration method comprising filtering solids suspended in a liquid and, from time to time during the filtering operation, simultaneously removing said solids deposited on a filter media to maintain continued filtering by
    drawing by suction a fluid to be filtered into a drum filter having an outer perforated wall and a filter media on the outside of said wall,
    drawing filtered fluid into a perforated pipe inside the drum type filter,
    from time to time during the filtering operation, simultaneously removing accumulated solids from the filter media by exposing a portion of the filter media to a near vacuum thereby drawing filtered fluid outwardly through the portion of the filter media exposed to the near vacuum which breaks off the accumulated soilds on such portion of the filter media, wherein the drum filter is rotated during the removal of the accumulated solids such that about the entire filter media is exposed to the near vacuum upon a complete rotation of the drum filter while said filtered fluid continues to be drawn into said perforated pipe.

11. The filtration method of claim 10 wherein two drum filters are utilized.

* * * * *